(12) United States Patent
Bahr

(10) Patent No.: US 9,125,215 B2
(45) Date of Patent: Sep. 1, 2015

(54) DISTRIBUTING AN ADVERTISEMENT OF CHANNEL ASSIGNMENTS IN A WIRELESS MESH NETWORK OVER A SEQUENCE OF MULTIPLE ADVERTISEMENT ELEMENTS

(75) Inventor: Michael Bahr, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/697,877

(22) PCT Filed: May 17, 2011

(86) PCT No.: PCT/EP2011/057989
§ 371 (c)(1),
(2), (4) Date: Nov. 14, 2012

(87) PCT Pub. No.: WO2011/144626
PCT Pub. Date: Nov. 24, 2011

(65) Prior Publication Data
US 2013/0058323 A1 Mar. 7, 2013

(30) Foreign Application Priority Data

May 17, 2010 (EP) .................................... 10005133

(51) Int. Cl.
*H04B 7/212* (2006.01)
*H04W 74/08* (2009.01)
(Continued)

(52) U.S. Cl.
CPC ........ *H04W 74/0816* (2013.01); *H04W 74/002* (2013.01); *H04W 84/18* (2013.01)

(58) Field of Classification Search
USPC .......................... 370/348, 337, 322, 389, 395
See application file for complete search history.

(56) References Cited

U.S. PATENT DOCUMENTS

| 8,503,423 | B2 | 8/2013 | Marinier et al. ............... 370/349 |
| 8,774,098 | B2 | 7/2014 | Ketchum et al. .............. 370/328 |

(Continued)

FOREIGN PATENT DOCUMENTS

| CN | 1894900 A | 1/2007 | .............. H04L 12/28 |
| CN | 101657998 A | 2/2010 | .............. H04L 12/56 |

(Continued)

OTHER PUBLICATIONS

Cicconetti, C. et al., "Scheduling and Dynamic Relocation for IEEE 802.11s Mesh Deterministic Access," Sensor, Mesh and Ad Hoc Communications and Networks, Secon 8, 5$^{th}$ Annual IEEE Communications Society Conference on IEEE, 10 pages, Jun. 16, 2008.
Hiertz, Guido R. et al., "IEEE 802.11s: The WLAN Mesh Standard," IEEE Wireless Communications, IEEE Service Center, vol. 17, No. 1, 8 pages, Feb. 1, 2010.

(Continued)

*Primary Examiner* — Kwang B Yao
*Assistant Examiner* — Adam Duda
(74) *Attorney, Agent, or Firm* — Slayden Grubert Beard PLLC

(57) ABSTRACT

According to the known IEEE 802.11s Draft Standard for WLAN Mesh Networking, version D5.0, the size of an information element is restricted to a length of 255 octets. Due to the definition of an MCCAOP advertisements element as a general information element this restriction is a major drawback leading to a maximum of 62 MCCA reservations to be advertised by an MCCAOP advertisements element. Although this number of reservations might be sufficient in the majority of situations, it is easily imaginable that there are situations which could require an advertisement exceeding this limit of 62 MCCA reservations. According to the disclosure, an MCCAOP advertisement—which is a set of MCCAOP reservations that needs to be advertised—is split over multiple MCCAOP advertisements elements. This may advantageously allow advertising more than 62 MCCAOP reservations to neighboring mesh nodes in a wireless mesh network which is configured to use MCCA.

10 Claims, 2 Drawing Sheets

| MCCA Access Fraction | MCCA Access Fraction Limit | Accept Reservations | Partial Advertisement | Advertisements Element Number | More Elements | Reserved |
|---|---|---|---|---|---|---|

(51) Int. Cl.
*H04W 74/00* (2009.01)
*H04W 84/18* (2009.01)

(56) References Cited

U.S. PATENT DOCUMENTS

2002/0181475 A1* 12/2002 Dove et al. .................... 370/398
2006/0227801 A1* 10/2006 Nanda et al. .................. 370/447
2007/0060141 A1* 3/2007 Kangude et al. ............. 455/445

FOREIGN PATENT DOCUMENTS

EP          2059084 A1    5/2009   ............. H04L 12/56
WO     2011/144626 A1   11/2011   ............ H04W 74/08

OTHER PUBLICATIONS

IEEE P802.11s™/D5.0, "Draft Standard for Information Technology—Telecommunications and Information Exchange Between Systems—Local and Metropolitan Area Networks—Specific Requirements," Part 11: Wireless LAN Medium Access Control (MAC) and Physical Layer (PHY) Specifications, Amendment 10: Mesh Networking, 802.11 Working Group of the IEEE 802 Committee, 329 pages, Apr. 2010.
Bahr, Michael, "MCCAOP Advertisements," doc.: IEEE 802.11-10/815r0, Siemens AG, 14 pages, Jul. 14, 2010.
International Search Report and Written Opinion, Application No. PCT/EP2011/057989, 11 pages, Aug. 3, 2011.
Korean Office Action, Application No. 1020127032939, 3 pages, Oct. 30, 2014.
Chinese Office Action, Application No. 201180024377.5, 12 pages, Dec. 16, 2014.

* cited by examiner

| Element ID | Length | MCCA Information | TX-RX Times Report | Broadcast Times Report | Interfering Times Report |
|---|---|---|---|---|---|

State of the Art

FIG 1

| MCCA Access Fraction | MCCA Access Fraction Limit | Accept Reservations | TX-RX Report Present | Broadcast Report Present | Interfering Report Present | Partial Report | Reserved |
|---|---|---|---|---|---|---|---|

State of the Art

FIG 2

| Element ID | Length | MCCAOP Advertisement Sequence Number | MCCA Information | TX-RX Times Report | Broadcast Times Report | Interfering Times Report |
|---|---|---|---|---|---|---|

FIG 3

| MCCA Access Fraction | MCCA Access Fraction Limit | Accept Reservations | Partial Advertisement | Advertisements Element Number | More Elements | Reserved |
|---|---|---|---|---|---|---|

FIG 4

DISTRIBUTING AN ADVERTISEMENT OF CHANNEL ASSIGNMENTS IN A WIRELESS MESH NETWORK OVER A SEQUENCE OF MULTIPLE ADVERTISEMENT ELEMENTS

CROSS-REFERENCE TO RELATED APPLICATIONS

This application is a U.S. National Stage Application of International Application No. PCT/EP2011/057989 filed May 17, 2011, which designates the United States of America, and claims priority to EP Patent Application No. 10005133.3 filed May 17, 2010. The contents of which are hereby incorporated by reference in their entirety.

TECHNICAL FIELD

The disclosure relates to an information element and method for advertising channel reservations in a wireless mesh network, particularly according to IEEE 802.11s Draft Standard for WLAN Mesh Networking.

BACKGROUND

In sections 7.3.2.104-107, 7.4.18.3-7, 9.9a.3 of the known IEEE 802.11s Draft Standard for WLAN Mesh Networking, version D5.0, a deterministic access mechanism for wireless mesh networks called MCCA (Mesh Coordinated Channel Access) is described.

The time between subsequent DTIM Beacons (Delivery Traffic Indication Message) is divided into a fixed number of MCCA time slots. These time slots can be reserved between neighboring mesh stations. An MCCA reservation, hereinafter also referred to as channel reservation, contains periodic definition of so-called MCCAOPs (MCCA opportunities). An MCCAOP is a continuous set of MCCA time slots that can be used for transmission. The initiator of such a reservation is called the MCCAOP owner, and has the right to transmit during the MCCAOP. The receiver is called the MCCAOP responder.

Due to a distributed nature of a wireless mesh network and due to its shared transmission medium it is necessary that each mesh station distributes its MCCA reservations at least in its 2-hop neighborhood. This is done with MCCAOP advertisements, which contain the MCCA reservations of the sending mesh station and the MCCA reservations of its neighboring mesh stations.

The MCCAOP advertisement which is defined as an information element in section 7.3.2.106 of said draft standard as an MCCAOP advertisements element.

Such an MCCAOP advertisements element is included in different frame types such as an MCCAOP advertisement frame, a beacon frame or a probe response frame. The former MCCAOP advertisement frame exclusively includes one single MCCAOP advertisements element whereas the latter beacon frame and the probe response frame may contain one single MCCAOP advertisements element in addition to an extensive amount of payload additionally included in the beacon frame or in the probe response frame.

According to the draft standard the size of an information element is restricted to a length of 255 octets. Due to the definition of an MCCAOP advertisements element as a general information element this restriction is a major drawback leading to a maximum of 62 MCCA reservations to be advertised by an MCCAOP advertisements element.

Although this number of reservations might be sufficient in the majority of situations, it is easily imaginable that there are situations which could require an advertisement exceeding this limit of 62 MCCA reservations.

SUMMARY

In one embodiment, an advertisements element is provided for advertising channel reservations by an advertisement in a wireless mesh network, the advertisement being adapted for at least partially advertising channel reservations known by a transmitting node, the advertisement including a sequence of advertisements elements, the advertisements element comprising: at least one report field, each report field being adapted to comprise a report of channel reservations related to said report, whereby said channel reservations being distributed over likewise report fields of the sequence of advertisements element, a field containing an advertisement sequence number, the advertisement sequence number identifying the sequence of advertisements elements related to the advertisement, the advertisement sequence number being equal for each advertisements element of the advertisement, and at least one field enabling a determination whether the advertisements element is the last advertisements element of the sequence.

In a further embodiment, the advertisements element includes a field indicating an advertisements element number being assigned in ascending order to each advertisements element within the sequence of advertisements elements. In a further embodiment, the advertisements element includes a field indicating whether there are further advertisements elements belonging to the advertisement. In a further embodiment, the advertisements element includes a field indicating whether said advertisement comprising said advertisements element includes all reservations known to the transmitting node. In a further embodiment, the report field includes a field indicating whether the report of the advertisement is distributed over a plurality of advertisements elements. In a further embodiment, the report field includes a field indicating whether the report of the advertisement contains all channel reservations of the transmitting node for said specific report.

In another embodiment, a method is provided for advertising channel reservations by an advertisement in a wireless mesh network, wherein the advertisement is adapted for at least partially advertising channel reservations known by a transmitting node, wherein the advertisement includes a sequence of advertisements element, and wherein the method comprises the steps of: dividing a set of channel reservations related to a report into a plurality of subsets, assigning each subset of channel reservations to a report field of a sequence of advertisements elements, and transmitting each advertisements element of the advertisement, each advertisements element comprising an identical sequence number related to the advertisement, each advertisements element further comprising at least one field enabling a determination whether an advertisements element is the last advertisements element of the sequence.

In a further embodiment, the method includes transmitting the advertisements element by: an advertisement frame, a beacon frame, or a probe response frame. In a further embodiment, the method includes setting a value of a partial advertisement field to zero if all partial report fields of all report fields are set to a value of zero and setting the value of the partial advertisement field to a value of one if at least one of the partial report fields of all report fields is set to a value of one.

In another embodiment, a node in a mesh network comprises means for carrying out any of the methods disclosed above.

In another embodiment, a computer program product is provided, which contains a program code stored on a computer-readable medium and which, when executed on a processor of a node in a mesh network, carries any of the methods disclosed above.

BRIEF DESCRIPTION OF THE DRAWINGS

Example embodiments will be explained in more detail below with reference to figures, in which:

FIG. 1 shows a known structure of an MCCAOP advertisements element according to the state of the art;

FIG. 2 shows a known structure of an MCCA information field of an MCCAOP advertisements element according to the state of the art;

FIG. 3 shows an exemplary structure of an MCCAOP advertisements element according to an embodiment;

FIG. 4 shows an exemplary structure of an MCCA information field according to an embodiment;

DETAILED DESCRIPTION

Figure 5:
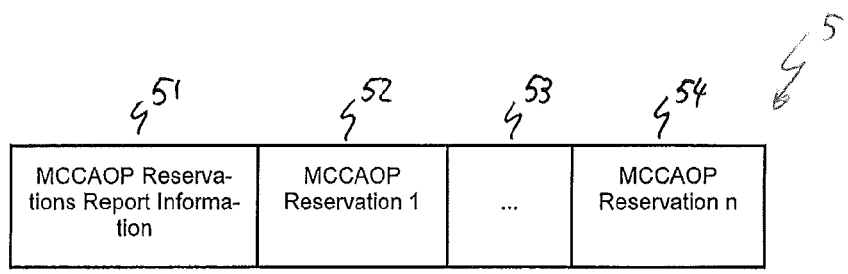
FIG. 5 shows an exemplary structure of an MCCAOP reservation report field according to an embodiment.

Some embodiments provide means allowing for a larger amount of reservations to be advertised by an MCCAOP advertisements element.

For example, according to one embodiment, an advertisements element—which is to be understood being the general case of an MCCAOP advertisements element or, alternatively, being equal to an MCCAOP advertisements element—for advertising channel reservations by an advertisement in a wireless mesh network is provided, the advertisement being adapted for at least partially advertising channel reservations known by a transmitting node, the advertisement including a sequence of advertisements elements. The advertisements element comprises at least one report field, each report field being adapted to comprise a report of channel reservations related to said report, whereby said channel reservations being distributed over likewise report fields of the sequence of advertisements element. The advertisements element further comprises a field containing an advertisement sequence number, the advertisement sequence number identifying the sequence of advertisements elements related to the advertisement, the advertisement sequence number being equal for each advertisements element of the advertisement. The advertisements element further comprises a field enabling a determination whether the advertisements element is the last advertisements element of the sequence.

According to a further embodiment, a method for advertising channel reservations by an advertisement in a wireless mesh network is provided, the advertisement being adapted for at least partially advertising channel reservations known by a transmitting node, the advertisement including a sequence of advertisements elements. The method comprising the steps of dividing a set of channel reservations related to a report into a plurality of subsets, assigning each subset of channel reservations to a report field of a sequence of advertisements elements, transmitting each advertisements element of the advertisement, each advertisements element comprising an identical sequence number related to the advertisement, each advertisements element further comprising a field enabling a determination if an advertisements element is the last advertisements element of the sequence.

According to a further embodiment, a node in a mesh network is provided, the node including means for carrying out the disclosed method.

According to a further embodiment, a computer program product is provided, the computer program product containing a program code stored on a computer-readable medium which, when executed on a processor of a node in a mesh network, carries out a method as disclosed herein.

According to some embodiments, an MCCAOP advertisement—which is a set of MCCAOP reservations that needs to be advertised—is split over multiple MCCAOP advertisements elements.

Each MCCAOP advertisement may have a unique advertisement sequence number, which identifies the advertisement and which may advantageously allow to distinguish outdated advertisements from a current advertisement. The MCCAOP advertisement sequence number is contained in each MCCAOP advertisements element.

Some embodiments may allow advertising more than 62 MCCAOP reservations to neighboring mesh nodes in a wireless mesh network which is preferably configured to use MCCA. According to known methods, a number of more than 62 MCCAOP reservations has not been possible due to the size limit of the MCCAOP Advertisements element and the use of only one MCCAOP Advertisements element in the transmitted data frames implying that an MCCAOP advertisement can only consist of a single MCCAOP Advertisements element.

An MCCAOP advertisement may be reconstructed from multiple MCCAOP Advertisements elements. This is enabled by the advertisement sequence number, the advertisement element number, and the more elements field. It may be possible to detect that all MCCAOP Advertisements elements of an MCCAOP advertisement have been received.

The advertisement sequence number may allow distinguishing current from outdated MCCAOP reservation information.

The MCCAOP advertisements frame may be extended to carry all MCCAOP advertisements elements of an MCCAOP advertisement.

As a consequence, a structure of a beacon frame can remain by the convention of carrying no more than one MCCAOP advertisements element, whereby a multiplicity of consecutive MCCAOP advertisements elements of an MCCAOP advertisement is split over a multiplicity of consecutive beacons.

According to IEEE 802.11s Draft Standard for WLAN Mesh Networking, it is recommended to use only a single MCCAOP Advertisements element in a Probe Response frame, probably a partial MCCAOP advertisement. However, also multiple MCCAOP Advertisements elements are possible in a Probe Response frame.

According to an embodiment, each MCCAOP advertisements element of a specific MCCAOP advertisement has an element number which starts by a value of zero and which is incremented by a value of one. A field »more elements« within the MCCAOP advertisements element indicates whether there are more MCCAOP advertisements elements that belong to this advertisement, based on the order of the element number.

According to an embodiment, the reconstruction of an MCCAOP advertisement from multiple MCCAOP Advertisements elements is further supported by a »more elements« field indicating whether there are further advertisements elements belonging to the advertisement. This is, among others, one possible embodiment of a field enabling a determination whether the advertisements element is the last advertisements element of a sequence and further supports detection that all MCCAOP Advertisements elements of an MCCAOP advertisement have been received.

According to an embodiment, the reconstruction of an MCCAOP advertisement from multiple MCCAOP Advertisements elements is further supported by an advertisement element number being assigned in ascending order to each advertisements element within the sequence of advertisements elements. This is, among others, one possible embodiment of holding track of the sequence of MCCAOP Advertisements elements received by a node.

According to an embodiment, an additional flag indicates whether a certain report of an MCCAOP advertisement is distributed over multiple MCCAOP advertisements or is solely contained in a single MCCAOP advertisement.

According to an embodiment, different fields for partial information (Partial Advertisement, Partial Report, and Distributed Report) allow determining the completeness of the advertised MCCAOP reservations faster and also for a subset of the tracked MCCAOP reservations of the transmitter of the MCCAOP Advertisements elements.

According to an embodiment, each type of MCCAOP reservations report—including TX-RX times report, broadcast times report and interfering times report—has its specific flag indicating whether it is a complete or partial report. This allows a complete update of a subset of MCCAOP reservations. Hereinafter, a flag is to be understood as a Boolean variable of a field having a length of one bit. This Boolean variable can either carry a value of »zero«, also referred to as »false« or, alternatively, a value of »one«, also referred to as »true«.

FIG. 1 shows a known structure of an MCCAOP advertisements element 1 according to IEEE 802.11s Draft Standard for WLAN Mesh Networking, version D5.0 which is used to advertise the MCCA reservations at a mesh station and at its neighboring mesh stations.

The MCCAOP advertisements element 1 includes a first field 11 captioned »Element ID« and having a length of one octet. A second field 12 is captioned »Length« and has a length of one octet. A third field 13 is captioned »MCCA information« and has a length of four octets. A fourth field 14 is captioned »TX-RX times report« and has variable length. A fifth field 15 is captioned »broadcast times report« and has variable length. A sixth field 16 is captioned »interfering times report« and has variable length.

The advertised MCCAOP reservations are classified into three groups:

The fourth field 14 captioned »TX-RX times report« contains a variable number of MCCAOP reservations. With the aid of the field TX-RX times report, a mesh node advertises the MCCAOPs in which it is involved as an MCCAOP owner or an MCCAOP responder and in which individually addressed frames are transmitted. This report optionally includes transmission times and reception times of a node collocated with the mesh node, for example Beacon and HCCA (Hybrid Coordination Function Controlled Access) times.

The fifth field 15 captioned »broadcast times report« contains a variable number of MCCAOP reservations. With the aid of the field broadcast times report, a mesh node advertises the MCCAOPs in which it is involved as an MCCAOP owner or an MCCAOP responder and in which group addressed frames are transmitted.

The sixth field 16 captioned »interfering times report« contains a variable number of MCCAOP reservations. Through the interfering times report, a mesh node reports the TX-RX times and broadcast times of its peer mesh nodes and optionally its neighboring non-peer mesh nodes, excluding its own TX-RX times and broadcast times.

The first field 11 captioned »Element ID« is set to a specific value assigned to the MCCAOP Advertisements element type.

The second field 12 captioned »Length« defines a number of octets of information following the second field. A number of 255 octets of information is the largest possible value due to the length of the second field 12 captioned »Length«, which is one octet.

The third field 13 captioned »MCCA Information« contains information about status of the MCCA, about a structure of the MCCAOP advertisements element, and about a scope of the advertised information. The current structure of the MCCA Information field is shown in FIG. 2.

FIG. 2 shows a known structure of an MCCA information field 2 of an MCCAOP advertisements element 1 according to the state of the art.

The MCCA information field 2 includes a first field 21 captioned »MCCA Access Fraction« and having a length of 8 bits, ranging from bit zero (B0) until bit seven (B7). A second field 22 is captioned »MCCA Access Fraction Limit« having a length of 8 bits, ranging from bit eight (B8) until bit fifteen (B15). A third field 23 is captioned »Accept Reservations« having a length of one bit at the position of bit sixteen (B16). A fourth field 24 is captioned »TX-RX report present« having a length of one bit at the position of bit seventeen (B17). A fifth field 25 is captioned »broadcast report present« having a length of one bit at the position of bit eighteen (B18). A sixth field 26 is captioned »interfering report present« having a length of one bit at the position of bit nineteen (B19). A seventh field 27 is captioned »partial report« having a length of one bit at the position of bit twenty (B20). An eight field 28 is captioned »reserved« having a length of three bits, ranging from bit twenty-one (B21) until bit twenty-three (B23). For the sake of more clarity, bit numbers in brackets mentioned above are neither shown nor referenced in the drawing.

Fields 24-26 captioned »TX-RX Report Present«, »Broadcast Report Present«, »Interfering Report Present«, respectively, define whether the respective reports are present or not in an MCCAOP advertisements element.

Field 27 captioned »Partial Report« defines the scope of the advertised information. The Partial Report flag is set to zero if the MCCAOP advertisements element includes all known reservations and it is set to one if the MCCAOP advertisements element 1 does not include all known reservations. This definition has some consequences to the update process of the stored MCCAOP reservations at the recipient of an MCCAOP advertisement:

if the Partial Report flag in field 26 is set to zero, the stored information on MCCAOP reservations is completely replaced by the information on MCCAOP reservations contained in the MCCAOP advertisements element.

if the Partial Report flag in field 26 is set to one, the information on MCCAOP reservations contained in the MCCAOP advertisements element can only be added to the stored information on MCCAOP reservations. If the new information of the MCCAOP advertisements element contains an MCCAOP reservation which already exists in the stored information this might be simply overriden. However, it might be difficult to detect this, because the reported MCCAOP reservations do not include their MCCAOP reservation ID.

According to sections 7.2.3.1, 7.2.3.9 and 7.4.18.6 of the current version D5.0 of IEEE 802.11s, management frames carrying an MCCAOP Advertisements element (MCCAOP Advertisements frame, Beacon frame, and Probe Response frame) are not allowed to carry more than one MCCAOP Advertisements element.

FIG. 3 shows an exemplary structure of an MCCAOP advertisements element 3 according to an embodiment.

The MCCAOP advertisements element 3 includes a first field 31 captioned »Element ID« and having a length of one octet. A second field 32 is captioned »Length« having a length of one octet. A third field 33 is captioned »MCCAOP Advertisement Sequence Number« having a length of one octet. A fourth field 34 is captioned »MCCA Information« having a length of three octets. A fifth field 35 is captioned »TX-RX times report« having a variable length. A sixth field 36 is captioned »broadcast times report« having a variable length. A seventh field 37 is captioned »interfering times report« having a variable length.

A mesh node administering a flag captioned »dot11MCCAActivated« set to a value of true, i.e., a mesh node that uses the mesh coordinated channel access MCCA, shall track at least a certain number of MCCAOP reservations (dot11MCCAMinTrackStates), including its own reservations.

If the number of reservations in its MCCA neighborhood times is less than the maximum possible value (dot11MCCAMaxTrackStates), the mesh node can track and accept additional reservations. If the number of reservations in the MCCA neighborhood times of the mesh node is equal to or greater than the maximum possible value (dot11MCCAMaxTrackStates), the mesh node cannot track and accept additional reservations.

MCCAOP advertisements are used to advertise the tracked MCCAOP reservations of a mesh node with dot11MCCAActivated equal to true to its neighbor mesh nodes. The tracked MCCAOP reservations are advertised by sending one or more MCCAOP Advertisements elements to neighbor mesh nodes, which are usually peer mesh nodes.

The MCCAOP Advertisements element 3, having a structure as shown in FIG. 3, is used by a mesh node to advertise MCCAOP reservations to its neighbors. The format of the MCCAOP Advertisements element is as shown in FIG. 3.

An IEEE 802.11 information element, such as the MCCAOP Advertisements element 3, provides a structure for the information. One or more information elements are transmitted in IEEE 802.11 management frames.

The first field 31 captioned »Element ID« is set to a specific value assigned to the MCCAOP Advertisements element type.

The second field 32 of the MCCAOP Advertisements element 3 captioned »Length« defines a number of octets of information following the second field. A number of 255 octets of information is the largest possible value due to the length of the second field 32 captioned »Length«, which is one octet.

The third field 33 captioned »MCCAOP Advertisement Sequence Number« is one octet in length and is coded as an unsigned integer. It is set to the MCCAOP Advertisement Sequence Number specific to the transmitter of this MCCAOP Advertisements element. Each MCCAOP advertisement can be uniquely identified by its transmitter and the MCCAOP Advertisement Sequence Number. All MCCAOP Advertisements elements 3 belonging to a single MCCAOP advertisement have the same MCCAOP Advertisement Sequence Number.

A mesh node administering a flag captioned »dot11MCCAActivated« set to a value true, assign MCCAOP Advertisement Sequence Numbers from a single modulo-256 counter, starting at 0 and incrementing by 1 for each new MCCA advertisement.

A rollover mechanism ensures that the order is kept after incrementing from 255 to the next value, which is 0. The MCCAOP Advertisement Sequence Number field remains unchanged in all retransmissions of an MCCAOP Advertisements element.

The fourth field 34 captioned »MCCA Information« is three octets in length and is used to provide information on the MCCAOP reservations. The field comprises six fields illustrated in FIG. 4.

FIG. 4 shows an exemplary structure of an MCCA information field 4 according to an embodiment.

The MCCA information field 4 includes a first field 41 captioned »MCCA Access Fraction« and having a length of 8 bits, ranging from bit zero (B0) until bit seven (B7). A second field 42 is captioned »MCCA Access Fraction Limit« having a length of 8 bits, ranging from bit eight (B8) until bit fifteen (B15). A third field 43 is captioned »Accept Reservations« having a length of one bit at the position of bit sixteen (B16). A fourth field 44 is captioned »Partial Advertisement« having a length of one bit at the position of bit seventeen (B17). A fifth field 45 is captioned »Advertisements Element Number« having a length of three bits, ranging from bit eighteen (B18) until bit twenty (B20). A sixth field 46 is captioned »More Elements« having a length of one bit at the position of bit twenty-one (B21). A seventh field 47 is captioned »Reserved« having a length of two bits, ranging from bit twenty-two (B22) until bit twenty-three (B23).

Field 41 captioned »MCCA Access Fraction« and field 42 captioned »MCCA Access Fraction Limit« are not relevant for the embodiment described hereinafter.

The third field 43 captioned »Accept Reservations« is one bit in length. This field 43 is set to a value of 1 if the mesh station can accept and track additional reservations. If the number of reservations in the MCCA neighborhood times of the mesh node is less than the maximum possible value (dot11MCCAMaxTrackStates), the mesh node can track and accept additional reservations. In this case, the mesh node shall set the Accept Reservations field in the MCCAOP Information field to a value of one in the MCCAOP Advertisements elements 3 it transmits. If the number of reservations in the MCCA neighborhood times of the mesh node is equal to or greater than the maximum possible value (dot11MCCAMaxTrackStates), the mesh node cannot track and accept additional reservations. In this case, the mesh node shall set the Accept Reservations field in the MCCAOP Information field to 0 in the MCCAOP Advertisements elements 3 it transmits.

The fourth field 44 captioned »Partial Advertisement« is one bit in length. It is set to 0 if the MCCAOP advertisement, to which this MCCAOP Advertisements element belongs, includes all reservations known to the mesh node, and it is set to 1 if the MCCAOP Advertisements element does not include all known reservations.

The fifth field 45 captioned »Advertisements Element Number« is a 3-bit field 45 indicating the number of each MCCAOP Advertisements element of an MCCA advertisement. The Advertisements Element Number field is set to 0 in the first or only MCCAOP Advertisements element of an MCCA advertisement and is incremented by 1 for each successive MCCAOP Advertisements element of that MCCA advertisement. The fifth field 45 captioned »Advertisements Element Number« field remains unchanged in all retransmissions of an MCCAOP Advertisements element.

According to an alternative embodiment, the fifth field 45 has a length which is different from a length of 3 bits.

The sixth field 46 captioned »More Elements« is one bit in length. It is set to 0 if this MCCAOP Advertisements element is the last one of an MCCAOP advertisement. It is set to 1 if there is at least one more MCCAOP Advertisements element with a higher Advertisements Element Number for this MCCAOP advertisement.

A MCCAOP Advertisements element 3 according to FIG. 3 of an MCCAOP advertisement has a unique Advertisements Element Number, starting by a value of zero and incremented by a value of one for each MCCAOP Advertisements element of the same MCCAOP advertisement. The sixth field 46 captioned »More Elements« in the MCCA Information field shall be set to zero in the MCCAOP Advertisements element with the highest Advertisements Element Number within an MCCAOP advertisement. This indicates that it is the last MCCAOP Advertisements element for this MCCAOP advertisement. In all other MCCAOP Advertisements elements 3 of the same MCCAOP advertisement, the sixth field 46 captioned »More Elements« in the MCCA Information field shall be set to 1. This indicates that there are more MCCAOP Advertisements elements 3—usually having a higher Advertisements Element Number—which belong to this MCCAOP advertisement.

Turning back to FIG. 3, the fifth field 35 captioned »TX-RX Times Report« of the MCCAOP Advertisements element is a variable length field that contains an MCCAOP Reservation Report field. Using this field 35, a mesh node advertises the MCCAOPs in which it is involved as an MCCAOP owner or an MCCAOP responder and in which individually addressed frames are transmitted.

The sixth field 36 captioned »Broadcast Times Report« is a variable length field that contains an MCCAOP Reservation Report field. Using this field 36, a mesh node advertises the MCCAOPs in which it is involved as an MCCAOP owner or an MCCAOP responder and in which group addressed frames are transmitted. This report optionally includes known Target Beacon Transmission Times for which the mesh node is either the transmitter or the receiver and transmission times and reception times of a node collocated with the mesh node, for example Beacon and HCCA (Hybrid Coordination Function Controlled Access) times.

The seventh field 37 captioned »Interfering Times Report« is a variable length field which contains an MCCAOP Reservation Report field having a structure shown in FIG. 5. Using the seventh field 37 a mesh node reports the TX-RX and broadcast times of its neighboring peer mesh nodes and optionally its neighboring non-peer mesh nodes, excluding its own TX-RX and broadcast times.

FIG. 5 shows an exemplary structure of an MCCAOP reservation report field 5 according to an embodiment.

The MCCAOP reservation report field 5 is of variable length and is used to report a number of MCCAOP reservations for a specific MCCAOP reservation report (TX-RX, broadcast, or interfering times).

A first field 51 captioned »MCCAOP Reservations Report Information« has a length of one octet. Its structure is shown in FIG. 6.

Figure 6:
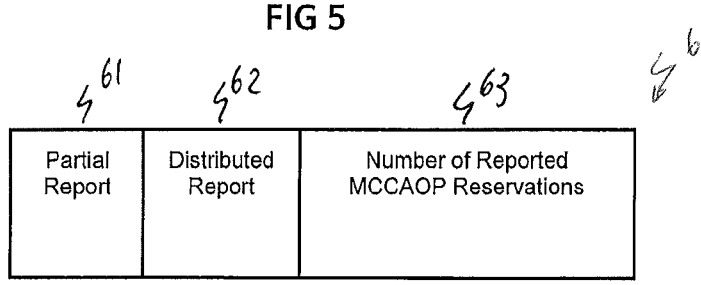
FIG. 6 shows an exemplary structure of an MCCAOP reservations report information field according to an embodiment.

FIG. 6 shows an exemplary structure of an MCCAOP reservations report information field 6 according to an embodiment.

A first field 61 of the MCCAOP reservations report information field 6 captioned »Partial Report« is one bit in length. This field 61 is set to a value of zero if the MCCAOP Reservation Report fields for this type of report of all MCCAOP Advertisements elements 3 that belong to the same MCCAOP advertisement include all known reservations relevant for this type of MCCAOP reservation report. It is set to a value of one if the MCCAOP Advertisements element does not include all known relevant reservations for this type of report of all MCCAOP Advertisements elements 3 that belong to the same MCCAOP advertisement for this type of MCCAOP reservation report.

A second field 62 captioned »Distributed Report« is one bit in length. It is set to a value of zero if the corresponding reservation report of the MCCAOP advertisement is contained completely in this MCCAOP Reservation Report field of this MCCAOP Advertisements element. It is set to a value of one if the corresponding reservation report of the MCCAOP advertisement is distributed over multiple MCCAOP Advertisements elements. The Distributed Report field is only of significance if the Number of Reported MCCAOP Reservations is greater than zero.

A third field 63 captioned »Number of Reported MCCAOP Reservations« has a length of 6 bits ranging from bit two (B2) until bit seven (B7). This field 63 contains an unsigned integer specifying the number n of MCCAOP reservations reported in the MCCAOP Reservation Report field 5 according to FIG. 5. The maximum number of MCCAOP reservations that can be reported in a single MCCAOP Reservation Report field is 62. The Number of Reported MCCAOP Reservations field is set to the number of MCCAOP reservations which are reported in this MCCAOP Reservation Report field of this specific MCCAOP Advertisements element. If Number of Reported MCCAOP Reservations is 0, no MCCAOP reservations are reported in this type of report.

Turning back to FIG. 5, the MCCAOP reservation report field 5 further includes a second field 52 captioned »MCCAOP Reservation 1« optionally followed by further reservation fields of that kind, which is exemplarily shown for a number n of reservation fields by a placeholder 53 and an nth field 54 captioned »MCCAOP Reservation n«. The »MCCAOP Reservation 1« through »MCCAOP Reservation n« fields 52,54 specify the reported MCCAOP reservations. Each field has a length of four octets and contains an MCCAOP reservation in a format specified by section 7.3.2.104.2 of the known IEEE 802.11s Draft Standard for WLAN Mesh Networking, version D5.0.

Turning back to FIG. 6, if there are no MCCAOP reservations to report for a specific type of reservation report, the third field 63 captioned »Number of Reported MCCAOP Reservations« is set to zero and no MCCAOP Reservation fields are present. That is, there will be always at least one octet for each one of the three possible reservation reports, which are TX-RX times report, broadcast times report and interfering times report.

The MCCAOP Advertisements element 3 can be carried in selected Beacon frames with a chosen frequency. The MCCAOP Advertisements element 3 may be transmitted in Probe Response frames. The MCCAOP Advertisements element 3 is also transmitted in an MCCAOP Advertisements frame. In other words, MCCAOP Advertisements elements 3 shall be transmitted in MCCAOP Advertisements frames and may be transmitted in Beacon frames and Probe Response frames.

The MCCAOP Advertisements frame is transmitted by a mesh node with dot11MCCAActivated equal to true to one or more neighbor peer mesh nodes with dot11MCCAActivated equal to true. This frame is transmitted using group addresses or individual addresses. An MCCAOP Advertisement frame contains all MCCAOP Advertisements elements 3 of an MCCAOP advertisement or a subset of them. All MCCAOP Advertisements elements 3 in the MCCAOP have the same MCCAOP advertisement sequence number. An MCCAOP advertisement may be split over multiple MCCAOP Advertisement frames.

A Beacon frame shall not contain more than one MCCAOP Advertisements element. If the MCCAOP advertisement includes more than one MCCAOP Advertisements element 3, subsequent MCCAOP Advertisements elements 3 are transmitted in subsequent Beacon frames. The MCCAOP Advertisements element is optionally present in Beacon frames when both flags, dot11MeshActivated and dot11MCCAActivated, are set to a value of true.

A Probe Response frame should not contain more than one MCCAOP Advertisements element. If the MCCAOP advertisement cannot be transmitted by only a single MCCAOP Advertisements element, only a partial MCCAOP advertisement that includes only a single MCCAOP Advertisements element should be transmitted. One or more MCCAOP Advertisements elements 3 with the same MCCA Advertisement Sequence Number are optionally present in Probe Response frames when both dot11MeshActivated and dot11MCCAActivated are set to a value of true.

The mesh node shall advertise the tracked reservations in the TX-RX, broadcast, and interfering times using one or more MCCAOP Advertisements elements, at least once in dot11MCCAAdvertPeriodMax DTIM intervals (Delivery Traffic Indication Message). It need not report all reservations in each MCCAOP advertisement.

An MCCAOP advertisement contains all or only a subset of the tracked MCCAOP reservations. This shall be indicated by setting the Partial Advertisement field in the MCCAOP Information field of all MCCAOP Advertisements elements 3 that belong to this MCCAOP advertisement to the same value. In case the advertisement contains all reservations, the Partial Advertisement fields are set to zero. The Partial Advertisement fields are set to 1, if the advertisement contains only a subset of the reservations. This can be useful, for instance, when the mesh node advertises new reservations only.

An MCCAOP advertisement may contain three different kinds of MCCA reservation reports:
a) TX-RX Times Report:
   All MCCAOP times for individually addressed frames for which the mesh node is the MCCAOP owner or the MCCAOP responder.
b) Broadcast Times Report:
   1. All MCCAOP times for group addressed frames for which the mesh node is the MCCAOP owner or the MCCAOP responder.
   2. Optionally, known Target Beacon Transmission Times for which the mesh node is either the transmitter or the receiver.
   3. Optionally, other transmission or reception times of a node that is collocated with the reporting mesh node, for example, Beacon or HCCA times of a collocated AP.
c) Interfering Times Report:
   1. TX-RX and broadcast times reported by the neighbor peer mesh nodes of the mesh node excluding those times for which the mesh node is either the MCCAOP owner or the MCCAOP responder.
   2. Optionally, TX-RX and broadcast times reported by the neighbor non-peer mesh nodes of the mesh node.

Each of the reports shall include a number of reported MCCAOP reservations. Each of the MCCAOP Advertisements elements 3 that belong to the MCCAOP advertisement may contain a TX-RX Times Report, a Broadcast Times Report, and an Interfering Times Report. The reported reservations of each report can be distributed over multiple MCCAOP Advertisements elements 3 if the MCCAOP advertisement includes multiple MCCAOP Advertisements elements.

An MCCAOP reservation report contains all or only a subset of the tracked MCCAOP reservations for this kind of report. This shall be indicated by setting the Partial Report field in the MCCAOP Reservations Report Information field of the MCCAOP Reservation Report field of all MCCAOP Advertisements elements 3 that belong to this kind of report in this MCCAOP advertisement to the same value. In case the advertisement contains all reservations for this kind of report, the corresponding Partial Report fields are set to 0. The corresponding Partial Report fields are set to 1, if the advertisement contains only a subset of the reservations for this kind of report. This can be useful, for instance, when the mesh node advertises new reservations only.

An MCCAOP Reservation Report field of an MCCAOP Advertisements element may contain all or only a subset of the MCCAOP reservations of this advertisement for this kind of report. This shall be indicated by setting the Distributed Report field in the MCCAOP Reservations Report Information field of the MCCAOP Reservation Report field of the MCCAOP Advertisements element. In case the MCCAOP Reservation Report field of this MCCAOP Advertisements element contains all reservations for this kind of report of the advertisement (no matter whether partial or complete advertisement), the Distributed Report field is set to a value of zero. Practically, a Distributed Report field set to a value of zero means that all TX-RX, broadcast, or Interference times of the (partial or complete) advertisement are reported in this single MCCAOP Advertisements element. The Distributed Report field is set to 1, if the MCCAOP Reservation Report field of this MCCAOP Advertisements element contains only a subset of the reservations for this kind of report of the advertisement (no matter whether partial or complete advertisement). Practically, a Distributed Report field set to a value of one means that all TX-RX, broadcast, or Interference times of the (partial or complete) advertisement are reported in more than one MCCAOP Advertisements elements. This might be useful to determine complete subsets of MCCAOP reservations earlier or if not all MCCAOP Advertisements elements 3 of an MCCAOP advertisement are received.

The following relationship between the Partial Advertisement field 44 and the Partial Report field 61 exists:
   The Partial Advertisements field 44 indicates whether the MCCAOP advertisement contains all tracked MCCAOP reservations of the mesh node (complete, set to 0) or only a subset of them (partial, set to 1).
   The Partial Report field 61 indicates whether the specific MCCAOP reservations report of the advertisement contains all tracked MCCAOP reservations of the mesh node for this specific report (TX-RX, broadcast, or interfering times) (complete, set to 0) or only a subset of them (partial, set to 1).
   The value of the Partial Advertisement field 44 shall be determined from the values of the Partial Report fields as follows (0 corresponds to false, 1 corresponds to true):
   Partial Advertisement:=Partial Report (TX-RX times) OR Partial Report (broadcast times) OR Partial Report (interfering times).

In other words, the value of the partial advertisement field 44 is set to zero if all partial report fields 61 of all report fields 35,36,37 are set to a value of zero and the value of the partial advertisement field 44 is set to one if at least one of the partial report fields 61 of all report fields 35,36,37 is set to a value of one.

That is, if the advertisement is complete, all the reports have to be complete as well. If one of the reports is only partial, the advertisement is partial. If the advertisement is partial, at least one report is partial.

The Distributed Report field 62 is not related to the Partial Advertisement field 44 or Partial Report field 61 and is set independent from the settings of these two fields. The Distributed Report field only indicates whether the corresponding reservation report of the advertisement is contained completely in this single MCCAOP Advertisements element 3 (set to 0) or is distributed over multiple MCCAOP Advertisements elements 3 (set to 1).

It is only necessary to have either the Partial Advertisements field or the Partial Report fields in order to ensure the correct processing of the MCCAOP advertisement (update if complete, add if only partial). However, it provides more information and flexibility if both are available. Furthermore, the Distributed Report fields are not necessary for the correct processing of the MCCAOP advertisement. However, they provide useful additional information that helps to determine completeness of a reservation report earlier.

If the mesh node can accept additional reservations, it shall set the Accept Reservations field in the MCCAOP Information field to 1 in the MCCAOP Advertisements elements 3 it transmits. Otherwise, it shall set the Accept Reservations field in the MCCAOP Information field to 0 in the MCCAOP Advertisements elements 3 it transmits.

A mesh node shall use the advertised MCCAOP reservations, which it received through MCCAOP Advertisements elements, or a subset of them only if it can determine whether they are a complete or a partial set of MCCAOP reservations. This is the case,
  if the mesh node received all MCCAOP Advertisements elements 3 that belong to an MCCAOP advertisement. The decision is made with the Partial Report fields in the MCCAOP Reservation Reports.
  for MCCAOP Reservation Reports with the Distributed Report field set to 0 and at least one reported MCCAOP reservation. The MCCAOP Advertisements element contains the complete report for this type of reservation report. The decision is made with the Partial Report field of this report.
  for MCCAOP Reservation Reports with the Partial Report field set to 1. This information is partial.

Furthermore, a mesh node may use any advertised MCCAOP reservations temporarily as a partial advertisement immediately.

A mesh node has received all MCCAOP Advertisements elements 3 that belong to an MCCAOP advertisement if,
  all MCCAOP Advertisements elements 3 have the same MCCAOP advertisement sequence number,
  the advertisements element numbers of the respective MCCAOP Advertisments elements 3 are a sequence from 0 up to the advertisements element number of the MCCAOP Advertisements element with the More Elements field set to 0.

If a mesh node receives an MCCAOP Advertisements element 3 with an MCCAOP Advertisement Sequence Number higher than in all recently received MCCAOP Advertisements elements, all MCCAOP advertisements with an MCCAOP advertisement sequence number smaller as the received one are considered outdated.

In the following, an example is described illustrating the principles outlined above. According to this example, assume a first mesh node A having its flag dot11MCCAActivated set to a value of true, which means that this mesh node A uses the Mesh Coordinated Channel Access MCCA.

The first Mesh node A can track 255 MCCAOP reservations at maximum (dot11MCCAMaxTrackStates). It is further assumed that the first mesh node A currently tracks 75 MCCAOP reservations, thereof:
  12 MCCAOP reservations for the transmission of individually addressed frames, where mesh node A is MCCAOP owner or MCCAOP responder. These reservations will appear in the TX-RX times.
  no MCCAOP reservation for the transmission of group addressed frames, where mesh node A is MCCAOP owner or MCCAOP responder. Such reservation would have appeared in the broadcast times.
  63 MCCAOP reservations reported by the neighbors of the first mesh node A where mesh node A is neither MCCAOP owner nor MCCAOP responder. These reservations will appear in the interfering times.

Now being assumed that the first mesh node A has been requested to send an MCCAOP advertisement to its neighbor, a second mesh node B, the first mesh node A will send a complete MCCAOP advertisement to mesh node B.

Since the first mesh node A has 75 tracked MCCAOP reservations, it will need 2 MCCAOP Advertisements elements 3 in order to transmit all 75 MCCAOP reservations.

The current MCCAOP Advertisement Sequence Number is 8.

Mesh node A constructs the necessary MCCAOP Advertisements elements 3 as follows:
For the first MCCAOP Advertisements element 3:
Element ID: as assigned for MCCAOP Advertisements element
Length: 255 (=1+3(1+12*4)+(1+0*4)+(1+50*4))
MCCAOP Advertisement Sequence Number: 9 (current MCCAOP Advertisement Sequence Number incremented by 1)
MCCA Information:
  MCCA Access Fraction
  MCCA Access Fraction Limit
  Accept Reservations: 1/true (75<255/dot11MCCAMaxTrackStates)
  Partial Advertisement: 0/false
  Advertisements Element Number: 0 (first element of advertisement)
  More Elements: 1 (there are 13 MCCAOP reservations left after this MCCAOP Advertisements elements 3 which need to be transmitted in another MCCAOP Advertisements element 3)
TX-RX Times Report
  MCCAOP Reservation Report Information
    Partial Report: 0/false
    Distributed Report: 0/false (the 12 MCCAOP reservations for the TX-RX times are all contained in this MCCAOP Advertisements element 3)
    Number of Reported MCCAOP Reservations: 12
  MCCAOP Reservation 1
    . . . .
  MCCAOP Reservation 12
Broadcast Times Report
  MCCAOP Reservation Report Information
    Partial Report: 0/false Distributed Report: 0/false (there are no MCCAOP reservations for the broadcast times)
Number of Reported MCCAOP Reservations: 0
Interfering Times Report
  MCCAOP Reservation Report Information
    Partial Report: 0/false
    Distributed Report: 1/true (only 50 of the 63 MCCAOP reservations for the interfering times are contained in this MCCAOP Advertisements element 3)
    Number of Reported MCCAOP Reservations: 50
  MCCAOP Reservation 1 (1st MCCAOP reservation of the interfering times)
  . . . .
  MCCAOP Reservation 50 (50th MCCAOP reservation of the interfering times)
For the second MCCAOP Advertisements element 3:
Element ID: as assigned for MCCAOP Advertisements element
Length: 59 (=1+3+(1+0*4)+(1+0*4)+(1+13*4))
MCCAOP Advertisement Sequence Number: 9 (belongs to same MCCAOP advertisement as the first MCCAOP Advertisements element 3)
MCCA Information:
  MCCA Access Fraction
  MCCA Access Fraction Limit
  Accept Reservations: 1/true (75<255/dot11MCCAMaxTrackStates)
  Partial Advertisement: 0/false
  Advertisements Element Number: 1 (second element of advertisement)
  More Elements: 0 (there are no more MCCAOP reservations left after this MCCAOP Advertisements elements which need to be transmitted)
TX-RX Times Report
  MCCAOP Reservation Report Information
    Partial Report: 0/false
    Distributed Report: 0/false (the 12 MCCAOP reservations for the TX-RX times are all contained in the first MCCAOP Advertisements element)
    Number of Reported MCCAOP Reservations: 0
Broadcast Times Report
  MCCAOP Reservation Report Information
    Partial Report: 0/false
    Distributed Report: 0/false (there are no MCCAOP reservations for the broadcast times)
    Number of Reported MCCAOP Reservations: 0
Interfering Times Report
  MCCAOP Reservation Report Information
    Partial Report: 0/false
    Distributed Report: 1/true (only 13 of the 63 MCCAOP reservations for the interfering times are contained in this MCCAOP Advertisements element)
    Number of Reported MCCAOP Reservations: 13
  MCCAOP Reservation 1 (51st MCCAOP reservation of the interfering times)
  . . . .
  MCCAOP Reservation 13 (63rd MCCAOP reservation of the interfering times)
Both MCCAOP Advertisements elements 3 are included in an MCCAOP Advertisement frame and sent to mesh node B.
The second mesh node B receives the MCCAOP Advertisement frame with the two MCCAOP Advertisements elements 3 described above. Since an MCCAOP Advertisement frame may contain multiple MCCAOP Advertisements elements 3 of the same MCCAOP advertisement and since these multiple MCCAOP Advertisements elements are already received, the second mesh node B might first process all MCCAOP Advertisements elements 3 of the received MCCAOP Advertisement frame before it updates its database of tracked reservations.

Alternatively, the second mesh node B might also start right after the first MCCAOP Advertisements element to update its database of tracked reservation, if this is possible based on the information contained in the MCCAOP Advertisements element.

After processing the first MCCAOP Advertisements element 3, mesh node B knows that
  this is a complete MCCAOP advertisement, so it will replace the corresponding reports for mesh node A in its database of tracked reservations with the received ones finally
  the TX-RX Times Report of mesh node A is completely contained in this MCCAOP Advertisements element, because the Partial Report field in the TX-RX-Times Report is set to 0, the Distributed Report field in the TX-RX Times Report is set to 0, and there are MCCAOP reservations reported. This means, mesh node B could already replace the formerly received TX-RX times of mesh node A with the MCCAOP reservations in the TX-RX Times Report of this MCCAOP Advertisements element 3.
  there will be at least one more MCCAOP Advertisements element because the More Elements field is set to 1.
  the interfering times of mesh node A include more than the 50 MCCAOP reservations transmitted in the Interfering Times Report of the first MCCAOP Advertisements element, because the Distributed Report field in the Interfering Times Report is set to 1. Mesh node B can add these 50 MCCAOP reservations to its database of tracked reservations. They will be replaced by the complete interfering times report of mesh node A as soon as all MCCAOP Advertisements elements of this MCCAOP advertisement are processed.

After processing the second MCCAOP Advertisements element, mesh node B knows that
  this is the last missing MCCAOP Advertisements element 3 of the MCCAOP advertisement with MCCAOP Advertisement Sequence Number 9 from mesh node A, because the More Elements field is set to 0, the Advertisements Element Number is 1, and mesh node B has already processed an MCCAOP Advertisements element from mesh node A with MCCAOP Advertisement Sequence Number 9 and Advertisements Element Number 0.
  it can now replace in its database of tracked reservations the formerly received TX-RX times, broadcast times, and interfering times of mesh node A with the MCCAOP reservations in the TX-RX Times Report, Broadcast Times Report, and Interfering Times Report of these two MCCAOP Advertisements elements. It does not need to do this for the TX-RX Times Report, if it replaced the information already after the first MCCAOP Advertisements element 3.

The first mesh node A also transmits beacons periodically. Assume that the same tracked MCCAOP reservations need to be advertised through beacons. The same two MCCAOP Advertisements elements as described above will be constructed.

The next beacon is supposed to contain an MCCAOP Advertisements element. A Beacon frame can only contain no more than one MCCAOP Advertisements element, so the two MCCAOP Advertisements elements of this advertisement have to be transmitted in subsequent Beacon frames of mesh node A. The steps for processing the MCCAOP Advertisements elements at a third mesh node C that receives the Beacon frames with the MCCAOP Advertisements elements are in principle the same as in the above described case with the MCCAOP Advertisement frame transmitted from mesh node A to mesh node B. However, there is some time between the two transmissions of an MCCAOP Advertisements element in the Beacon frames, and one of the Beacons even might not be received at the third mesh node C. Therefore, it may be advantageous if the receiving third mesh node C already updates the TX-RX times of mesh node A after receiving the first MCCAOP Advertisements element. This is possible, because the Partial Report field of the TX-RX Times Report is 0 (meaning complete report) and the Distributed Report field is 0 (meaning all reservation of the TX-RX times are contained in this MCCAOP Advertisements element) and there are MCCAOP reservations given in the TX-RX times report.

adds the received 50 MCCAOP reservations of the Interfering Times Report to the database of its tracked reservations. Note that this addition to the database of tracked reservations does not mean that already existing reservations in the database are added again.

What is claimed is:

1. A node device of a wireless mesh network comprising a plurality of communicatively coupled node devices, the node device configured to advertise channel reservations,
 the node device configured to use an advertisement for at least partially advertising channel reservations known by the node device,
 the advertisement being distributed over a plurality of advertisements elements defined as a sequence, each of the plurality of advertisement elements of the advertisement including the same set of fields, comprising:
  at least one report field, each report field configured to comprise a report of channel reservations related to said report, whereby said channel reservations are distributed over likewise report fields of the sequence of advertisements element,
  a field containing an advertisement sequence number identifying the sequence of advertisements elements related to the advertisement, the advertisement sequence number being equal for each advertisements element of the advertisement, and
  at least one field indicating whether that advertisements element is the last advertisements element of the sequence, wherein the at least one field of exactly one of the plurality of advertisement elements indicates that that advertisements element is the last advertisements element of the sequence.

2. The node device of claim 1, each of the plurality of advertisement elements of the advertisement including a field indicating an advertisements element number assigned in ascending order to each advertisements element within the sequence of advertisements elements.

3. The node device of claim 1, each of the plurality of advertisement elements of the advertisement including a field indicating whether there are further advertisements elements belonging to the advertisement.

4. The node device of claim 1, each of the plurality of advertisement elements of the advertisement including a field indicating whether said advertisement comprising said advertisements element includes all reservations known to the node device.

5. The node device of claim 1, the report field including a field indicating that the report of the advertisement is distributed over the plurality of advertisements elements.

6. The node device of claim 1, the report field including a field indicating whether the report of the advertisement contains all channel reservations of the node device for said specific report.

7. A method for advertising channel reservations by an advertisement in a wireless mesh network, the advertisement at least partially advertising channel reservations known by a transmitting node, the method comprising:
 dividing a set of channel reservations related to a report into a plurality of subsets,
 defining a plurality of advertisements elements for the advertisement, each of the plurality of advertisement elements including the same set of fields;
 defining a sequence for the plurality of advertisements elements;
 assigning each subset of channel reservations to a report field of a respective one of the plurality of advertisements elements, such that the set of channel reservations is distributed over the plurality of advertisements elements;
 wherein each of the plurality of advertisements elements comprises an indication of whether that advertisements element is the last advertisements element of the sequence, wherein exactly one of the plurality of advertisement elements indicates that that advertisements element is the last advertisements element of the sequence; and
 transmitting each advertisements element of the advertisement, each advertisements element comprising an identical sequence number related to the advertisement.

8. The method of claim 7, comprising transmitting each advertisements element by an advertisement frame, a beacon frame, or a probe response frame.

9. The method of claim 7, comprising, for each of the plurality of advertisement elements of the advertisement, setting a value of a partial advertisement field to zero if all partial report fields of all report fields are set to a value of zero and setting the value of the partial advertisement field to a value of one if at least one of the partial report fields of all report fields is set to a value of one.

10. A computer program product for advertising channel reservations by an advertisement in a wireless mesh network, the computer program product comprising a program code stored on a non-transitory computer-readable medium and which, when executed on a processor of a node in a mesh network, is operable to:
 divide a set of channel reservations related to a report into a plurality of subsets,
 define a plurality of advertisements elements for the advertisement, each of the plurality of advertisement elements including the same set of fields;
 define a sequence for the plurality of advertisements elements;
 assign each subset of channel reservations to a report field of a respective one of the plurality of advertisements elements, such that the set of channel reservations is distributed over the plurality of advertisements elements;
 wherein each of the plurality of advertisements elements comprises an indication of whether that advertisements element is the last advertisements element of the sequence, wherein exactly one of the plurality of advertisement elements indicates that that advertisements element is the last advertisements element of the sequence; and transmit each advertisements element of the advertisement, each advertisements element comprising an identical sequence number related to the advertisement.

\* \* \* \* \*